United States Patent
Hatae (10) Patent No.: US 8,677,296 B2
(45) Date of Patent: Mar. 18, 2014

(54) CIRCUIT DESIGN SUPPORT COMPUTER PRODUCT, METHOD, AND APPARATUS

(71) Applicant: Fujitsu Limited, Kawasaki (JP)

(72) Inventor: Kazuhiko Hatae, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/734,596

(22) Filed: Jan. 4, 2013

(65) Prior Publication Data

US 2013/0254728 A1    Sep. 26, 2013

(30) Foreign Application Priority Data

Mar. 26, 2012  (JP) .................................. 2012-070458

(51) Int. Cl.
*G06F 17/50*    (2006.01)
(52) U.S. Cl.
USPC ............................................................ 716/110
(58) Field of Classification Search
USPC .................................................. 716/100, 110
See application file for complete search history.

(56) References Cited

U.S. PATENT DOCUMENTS

| | | | |
|---|---|---|---|
| 6,925,628 B2 | 8/2005 | Ogawa et al. | |
| 7,216,329 B2 | 5/2007 | Kitahara et al. | |
| 2005/0289499 A1* | 12/2005 | Ogawa et al. | 716/18 |
| 2007/0129925 A1* | 6/2007 | Otsuki et al. | 703/14 |
| 2008/0115101 A1 | 5/2008 | Ishikawa | |
| 2008/0301602 A1* | 12/2008 | Koelbl et al. | 716/5 |
| 2009/0007087 A1* | 1/2009 | Ito et al. | 717/156 |
| 2012/0151453 A1* | 6/2012 | Finking et al. | 717/130 |

FOREIGN PATENT DOCUMENTS

| | | |
|---|---|---|
| JP | 2004-164627 | 6/2004 |
| JP | 2005-135177 | 5/2005 |
| JP | 2008-123103 | 5/2008 |

* cited by examiner

*Primary Examiner* — Suchin Parihar
(74) *Attorney, Agent, or Firm* — Fujitsu Patent Center (57) ABSTRACT

A computer-readable recording medium stores a design support program that causes a computer to execute a process that includes generating based on a control flow graph conversion result for operation description information concerning a circuit-under-design, a first synthesis result according to which a time length of 1 clock cycle of the circuit-under-design is greater than or equal to a clock period in which the circuit-under-design operates; calculating based on the generated first synthesis result, first circuit scale information indicating a circuit scale of the circuit-under-design; acquiring a second synthesis result that is for the circuit-under-design and conforms to a timing constraint that is based on the control flow graph conversion result; calculating second circuit scale information indicating the circuit scale of the circuit-under-design, based on the generated second synthesis result; and outputting the calculated first circuit scale information and the calculated second circuit information.

9 Claims, 11 Drawing Sheets

FIG.3

| CIRCUIT | AREA | DELAY |
|---|---|---|
| AND1 | S(AND1) | D(AND1) |
| AND2 | S(AND2) | D(AND2) |
| ⋮ | ⋮ | ⋮ |
| OR1 | S(OR1) | D(OR1) |
| OR2 | S(OR2) | D(OR2) |
| ⋮ | ⋮ | ⋮ |
| NOT1 | S(NOT1) | D(NOT1) |
| NOT2 | S(NOT2) | D(NOT2) |
| ⋮ | ⋮ | ⋮ |
| BUF1 | S(BUF1) | D(BUF1) |
| BUF2 | S(BUF2) | D(BUF2) |
| ⋮ | ⋮ | ⋮ |
| INV1 | S(INV1) | D(INV1) |
| INV2 | S(INV2) | D(INV2) |
| ⋮ | ⋮ | ⋮ |
| ADD 1 | S(ADD 1) | D(ADD 1) |
| ADD2 | S(ADD2) | D(ADD2) |
| ⋮ | ⋮ | ⋮ |
| SUB1 | S(SUB1) | D(DUB1) |
| SUB2 | S(SUB2) | D(DUB2) |
| ⋮ | ⋮ | ⋮ |
| MULT1 | S(MULT1) | D(MULT1) |
| MULT2 | S(MULT2) | D(MULT2) |
| ⋮ | ⋮ | ⋮ |
| DIV1 | S(DIV1) | D(DIV1) |
| DIV2 | S(DIV2) | D(DIV2) |
| ⋮ | ⋮ | ⋮ |
| SEL1 | S(SEL1) | D(SEL1) |
| SEL2 | S(SEL2) | D(SEL2) |
| ⋮ | ⋮ | ⋮ |
| F F 1 | S(F F 1) | D(F F 1) |
| F F 2 | S(F F 2) | D(F F 2) |
| ⋮ | ⋮ | ⋮ |

CIRCUIT DESIGN SUPPORT COMPUTER PRODUCT, METHOD, AND APPARATUS

CROSS REFERENCE TO RELATED APPLICATIONS

This application is based upon and claims the benefit of priority of the prior Japanese Patent Application No. 2012-070458, filed on Mar. 26, 2012, the entire contents of which are incorporated herein by reference.

FIELD

The embodiment discussed herein is related to design support.

BACKGROUND

Various conventional techniques for circuit design have been disclosed. For example, according to a high-level synthesis method (first conventional example), a control data flow graph (CDFG) is generated based on an input file and a restriction file, and a finite state machine (FSM) is generated based on the CDFG and a constraint for a digital circuit. Then, according to the high-level synthesis method, nodes of the CDGF are allocated to states of the FSM to perform scheduling. Finally, according to the high-level synthesis method, resources are allocated to each node of the CDFG, based on resource level layout information indicative of the layout of resources for constructing the digital circuit, to generate circuit information (see, e.g., Japanese Laid-Open Patent Publication No. 2004-164627).

According to an automated circuit design method (second conventional example), a cell library for normal cells and specification information of a circuit to be designed are acquired, the upper limit potential of a virtual ground line in the circuit is set, and a cell library for low-threshold cells is generated using the upper limit potential. Then, according to the automated circuit design method, the specification information is logically synthesized to generate a net list, and a layout is generated based on the net list, the cell library for normal cells, and the cell library for low-threshold cells (see, e.g., Japanese Laid-Open Patent Publication No. 2005-135177).

A program converter (third conventional example) converts an operation description program describing a series of operation contents into a circuit description program describing the design contents of a circuit that implements the operation contents. The program converter then generates an index indicative of elements of a circuit that is obtained when the design contents described by the circuit description program is implemented using one or more hardware components (see, e.g., Japanese Laid-Open Patent Publication No. 2008-123103).

The above conventional techniques, however, provide no objective index on the scale of the circuit, which makes it difficult for a designer to understand the approximate circuit scale obtained as a result of high-level synthesis. Even if managing to understand the circuit scale, the designer still has difficulty in determining whether the circuit scale is too large or appropriate.

SUMMARY

According to an aspect of an embodiment, a computer-readable recording medium stores a design support program that causes a computer to execute a process that includes generating based on a control flow graph conversion result for operation description information concerning a circuit-under-design, a first synthesis result according to which a time length of 1 clock cycle of the circuit-under-design is greater than or equal to a clock period in which the circuit-under-design operates; calculating based on the generated first synthesis result, first circuit scale information indicating a circuit scale of the circuit-under-design; acquiring a second synthesis result that is for the circuit-under-design and conforms to a timing constraint that is based on the control flow graph conversion result; calculating second circuit scale information indicating the circuit scale of the circuit-under-design, based on the generated second synthesis result; and outputting the calculated first circuit scale information and the calculated second circuit information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of the present invention will be explained in detail with reference to the accompanying drawings.

Figure 1:
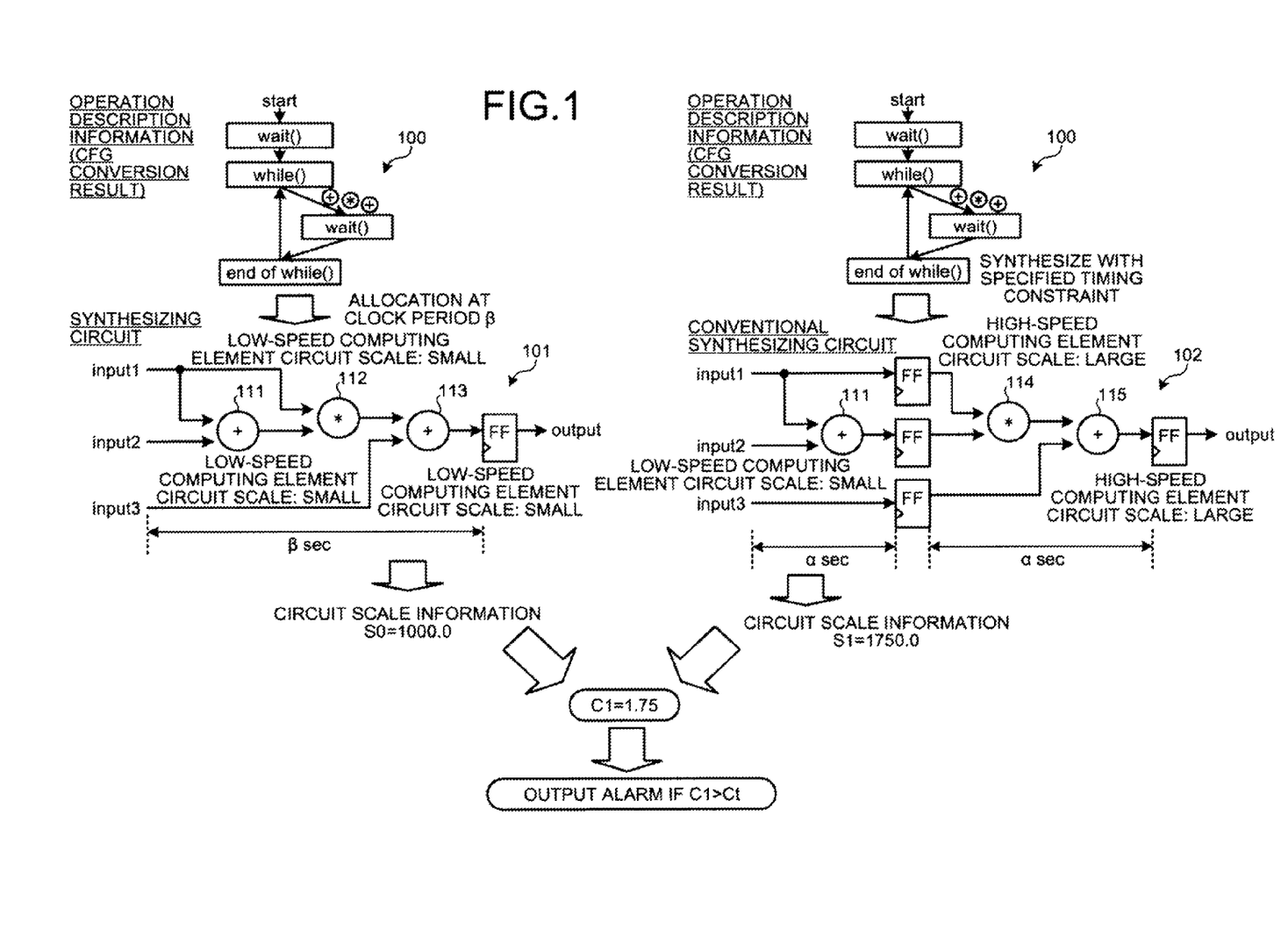
FIG. 1 is an explanatory diagram of an example of design support according to an embodiment.

FIG. 1 is an explanatory diagram of an example of design support according to an embodiment. In this example of design support, a design support apparatus generates a first synthesis result 101 with a sufficiently large clock period, from a control flow graph (CFG) conversion result 100 acquired from operation description information of a circuit to be designed. The first synthesis result 101 represents a computing circuit with the lowest operation rate, i.e., the greatest delay, and is generated as circuit information that sets a clock cycle to one clock cycle.

According to the first synthesis result 101, a time length greater than or equal to the total delay of computing circuits 111 to 113 is the clock period of one clock cycle. The design support apparatus determines circuit scale information indicative of the circuit scale of the first synthesis result 101, based on the total area of circuits making up the first synthesis result 101. In this example, circuit scale information S0 of the first synthesis result 101 is determined as S0=1000.

In a conventional manner, the design support apparatus generates from the CFG conversion result 100, a second synthesis result 102 according to a timing constraint given to the circuit-under-design. The second synthesis result 102 is circuit information generated as a result of adopting computing circuits conforming to the timing constraint. In FIG. 1, the timing constraint is given as two clock cycles, and the clock period of one clock cycle is $\alpha$ [sec].

As a result, a delay of the computing circuit 111 is less than or equal to $\alpha$ [sec], and the total delay of computing circuits 114 and 115 is also less than or equal to $\alpha$ [sec]. The design support apparatus determines circuit scale information S1 indicative of the circuit scale of the second synthesis result 102, based on the total area of circuits making up the second synthesis result 102. In this example, circuit scale information S1 of the second synthesis result 102 is determined as S1=1750.

The design support apparatus calculates comparison information C1, using the circuit scale information S0 (=1000) of the first synthesis result 101 and the circuit scale information S1 (=1750) of the second synthesis result 102. In this example, the comparison information C1 is calculated as S1/S2. When the comparison information C1 is greater than or equal to a threshold Ct, the design support apparatus outputs alarm information.

In this manner, whether the second synthesis result 102 is to be adopted can be determined by using the first synthesis result 101 as an objective index. The designer, therefore, can check the circuit scale of the second synthesis result 102 in a relative manner. In the example of FIG. 1, the comparison information C1 is determined and is compared with the threshold Ct. The design support apparatus may determine a difference of the circuit scale information S1 less the circuit scale information S0, to be the comparison information C1.

The design support apparatus may output the circuit scale information S0 and circuit scale information S1 as is so that the designer visually checks the output circuit scale information and makes a determination. In all cases, according to the embodiment, using the first synthesis result 101 as an objective index allows determining whether the circuit scale of the second synthesis result 102 is appropriate. When the size is appropriate, increases in the circuit scale can be suppressed.

Figure 2:
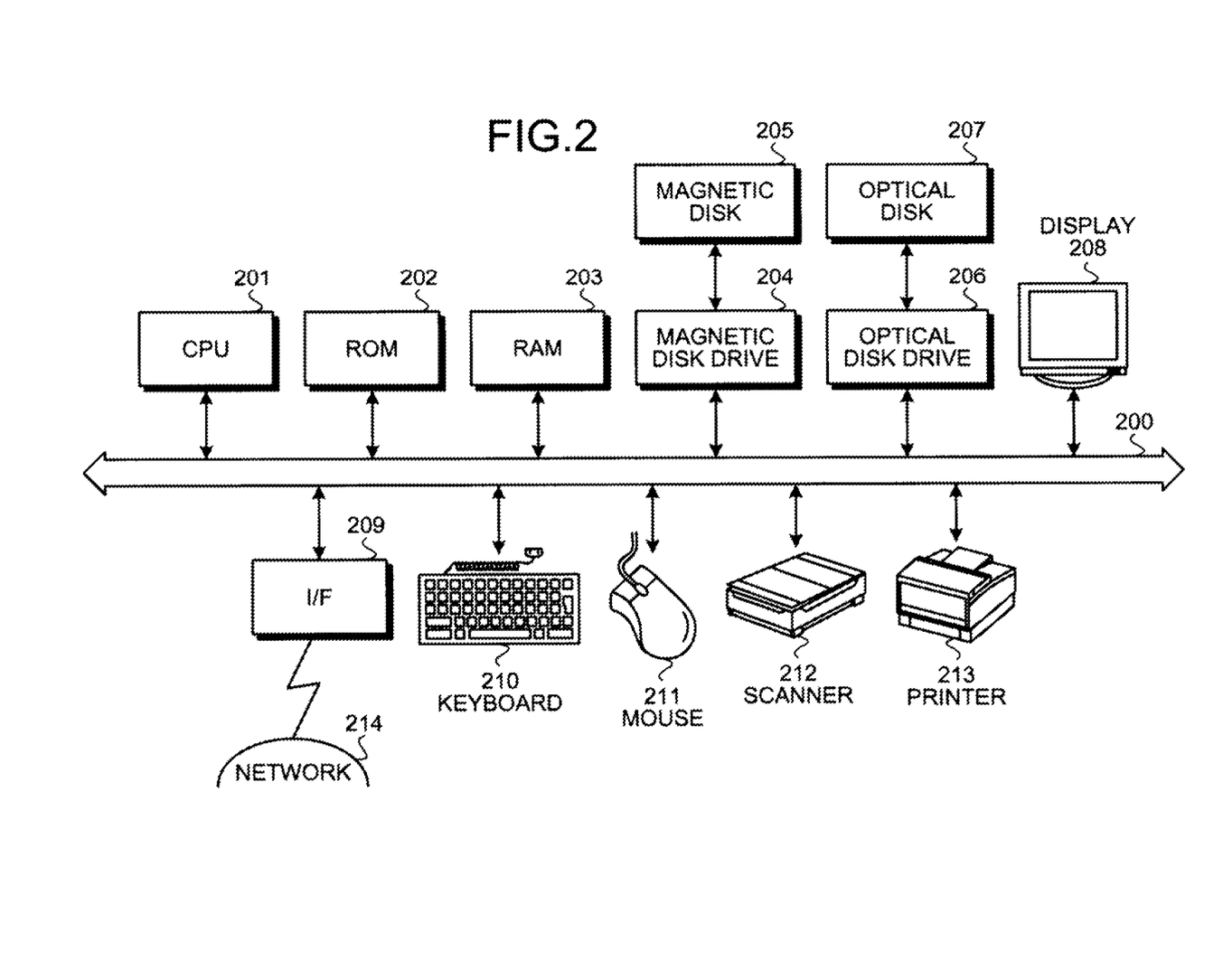
FIG. 2 is a block diagram of a hardware configuration of a design support apparatus according to the embodiment.

FIG. 2 is a block diagram of a hardware configuration of a design support apparatus according to the embodiment. As depicted in FIG. 2, the design support apparatus includes a central processing unit (CPU) 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 210, a mouse 211, a scanner 212, and a printer 213, respectively connected by a bus 200.

The CPU 201 governs overall control of the design support apparatus. The ROM 202 stores therein programs such as a boot program. The RAM 203 is used as a work area of the CPU 201. The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by a computer.

The display 208 displays, for example, data such as text, images, functional information, etc., in addition to a cursor, icons, and/or tool boxes. A liquid crystal display, a plasma display, etc., may be employed as the display 208.

The I/F 209 is connected to a network 214 such as a local area network (LAN), a wide area network (WAN), and the Internet through a communication line and is connected to other apparatuses through the network 214. The I/F 209 administers an internal interface with the network 214 and controls the input/output of data from/to external apparatuses. For example, a modem or a LAN adaptor may be employed as the I/F 209.

The keyboard 210 includes, for example, keys for inputting letters, numerals, and various instructions and performs the input of data. Alternatively, a touch-panel-type input pad or numeric keypad, etc. may be adopted. The mouse 211 is used to move the cursor, select a region, or move and change the size of windows. A track ball or a joy stick may be adopted provided each respectively has a function similar to a pointing device.

The scanner 212 optically reads an image and takes in the image data into the design support apparatus. The scanner 212 may have an optical character reader (OCR) function as well. The printer 213 prints image data and text data. The printer 213 may be, for example, a laser printer or an ink jet printer.

Figure 3:
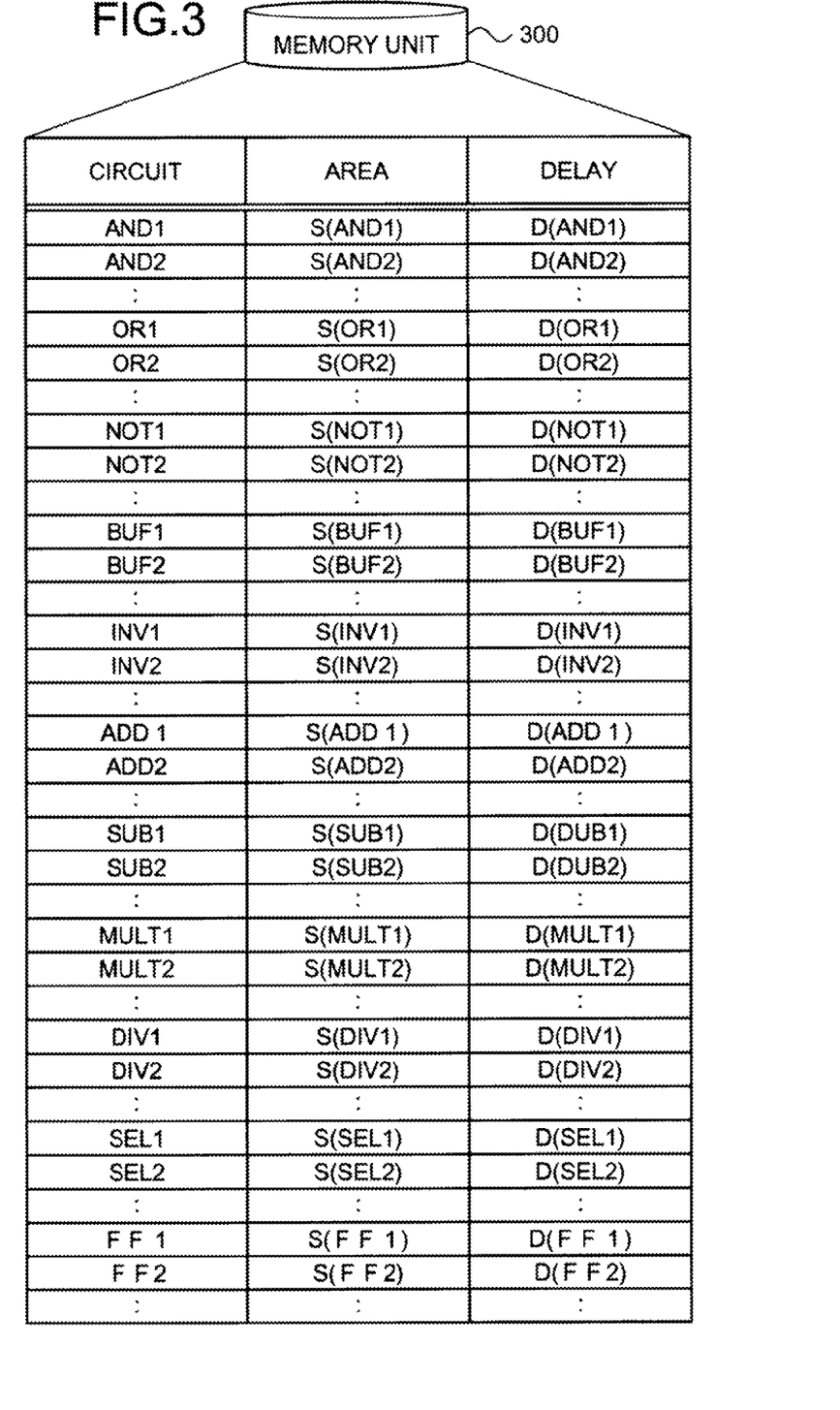
FIG. 3 is an explanatory diagram of an example of the contents of a memory unit.

FIG. 3 is an explanatory diagram of an example of the contents of a memory unit. A memory unit 300 is a library in which the area and delay of each circuit are stored. The memory unit 300 is referred to when a synthesizing process is executed. The function of the memory unit 300 is implemented, for example, by a storage device, such as the ROM 202, RAM 203, magnetic disk 205, and optical disk 207 depicted in FIG. 2.

Among the contents stored in the memory unit 300, circuit are constituent elements of the circuit-under-design, and include a computing circuit, such as an AND circuit and ADD (adder) circuit, and a data holding circuit, such as a register (FF) and selector (SEL). In the memory unit 300, multiple circuits identical in type but different in area and delay are classified as different circuits. A delay means the time span between the input of data to a circuit and the output of the data from the circuit. Although the smaller a delay is, the higher an operation rate is, the higher the operation rate is, the larger the area is.

Figure 4:
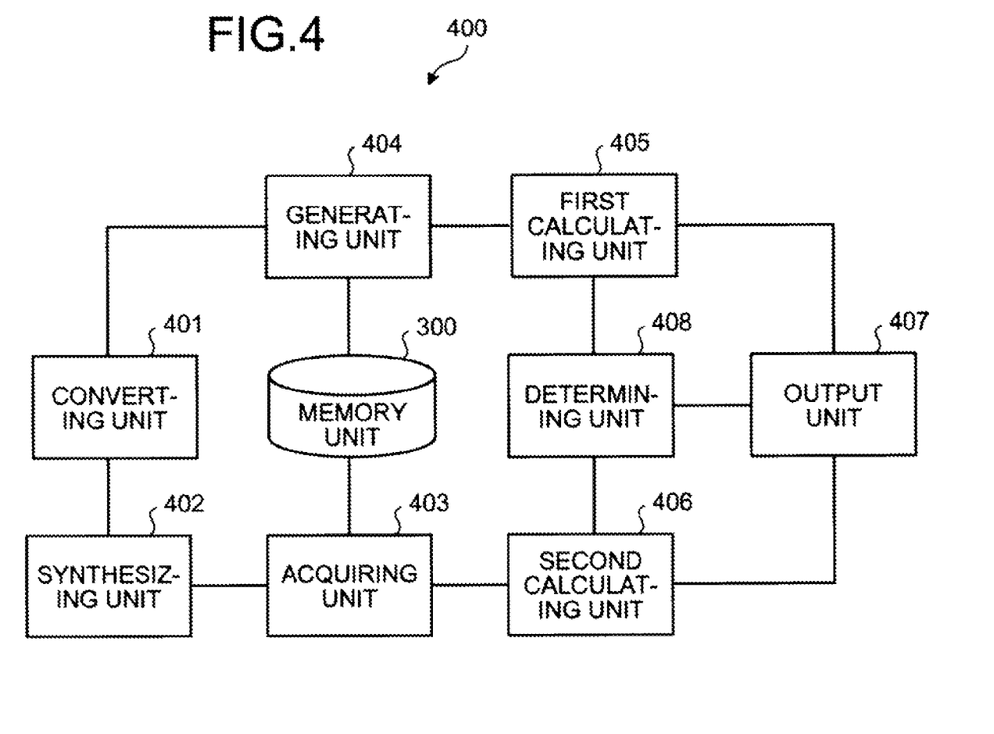
FIG. 4 is a block diagram of an example of a functional configuration of the design support apparatus.

FIG. 4 is a block diagram of an example of a functional configuration of the design support apparatus. The design support apparatus 400 includes the memory unit 300, a converting unit 401, a synthesizing unit 402, an acquiring unit 403, a generating unit 404, a first calculating unit 405, a second calculating unit 406, an output unit 407, and a determining unit 408. Functions of the converting unit 401, the synthesizing unit 402, the acquiring unit 403, the generating unit 404, the first calculating unit 405, the second calculating unit 406, the output unit 407, and the determining unit 408 are implemented by, for example, causing the CPU 201 to execute programs stored in the storage devices depicted in FIG. 2, such as the ROM 202, RAM 203, magnetic disk 205, and optical disk 207, or through the I/F 209.

The converting unit 401 performs CFG conversion of operation description information concerning the circuit-under-design. The operation description information is created by a description method higher in abstraction level than the register transfer level (RTL) and specifies no clock as the RTL does. The operation description information is written in, for example, C language, C++ language, SystemC language, etc.

Figure 5:
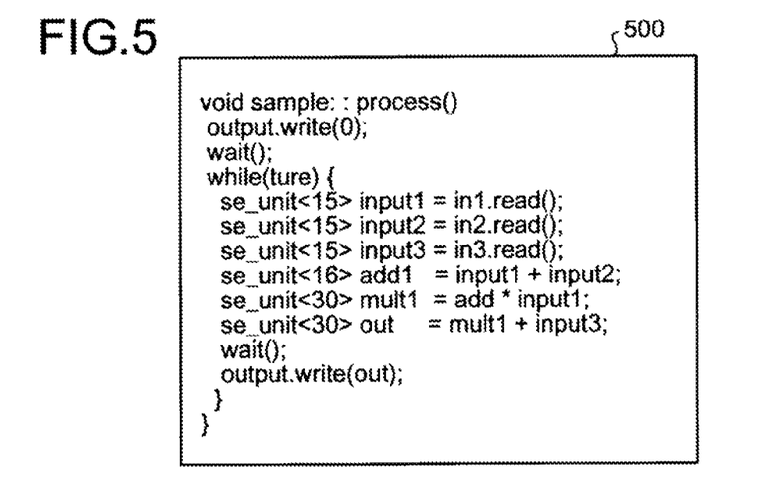
FIG. 5 is an explanatory diagram of an example of operation description information.
Figure 6:
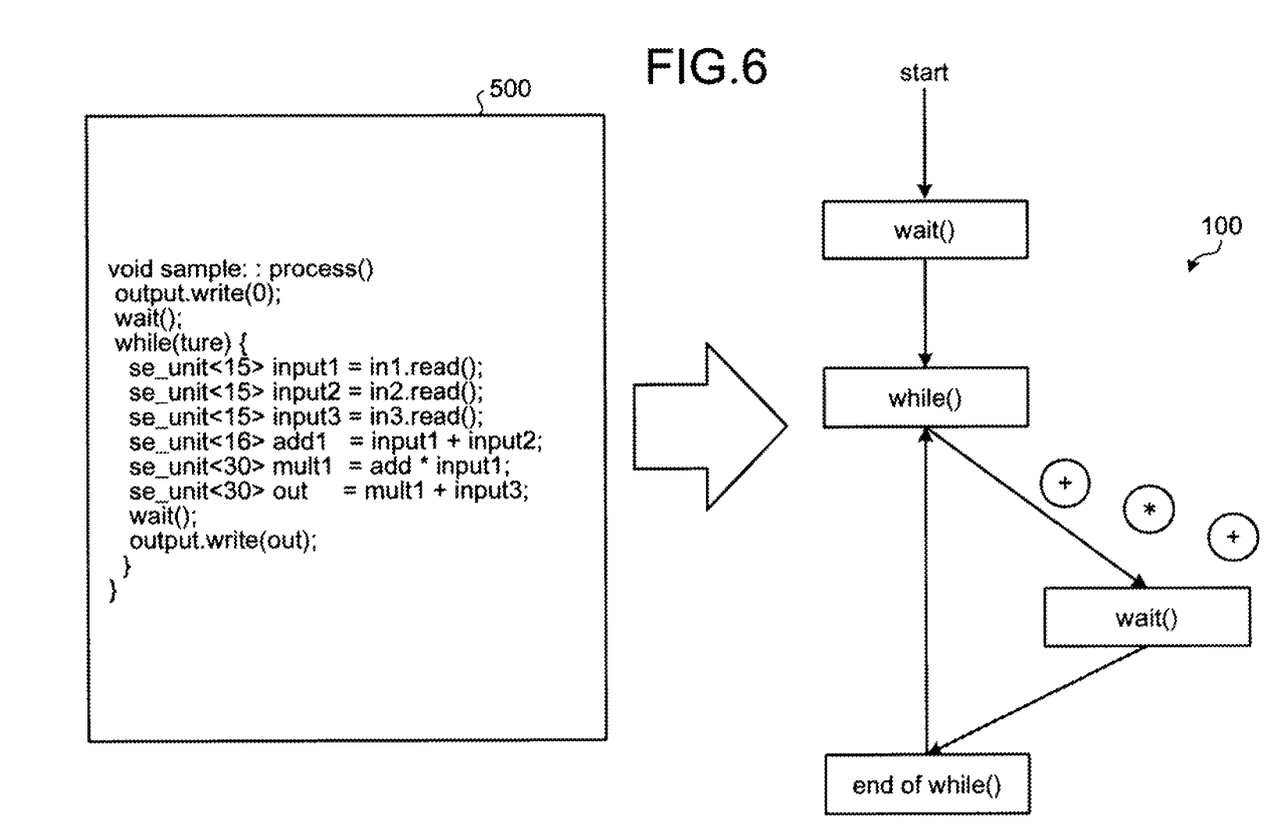
FIG. 6 is an example of CFG conversion of the operation description information depicted in FIG. 5.

FIG. 5 is an explanatory diagram of an example of operation description information. Operation description information 500 depicted in FIG. 5 is written in SystemC language. In the example of FIG. 5, two statements from the top to the second line express resetting. FIG. 6 is an example of CFG conversion of the operation description information 500 depicted in FIG. 5. In the CFG conversion result 100, wait( ) represents a clock cycle.

The synthesizing unit 402 generates the second synthesis result 102, based on the CFG conversion result 100. For example, the synthesizing unit 402 executes high-level synthesis conforming to a timing constraint given to the circuit-under-design, as in a conventional case. An example of synthesis by the synthesizing unit 402 will be described.

Figure 7:
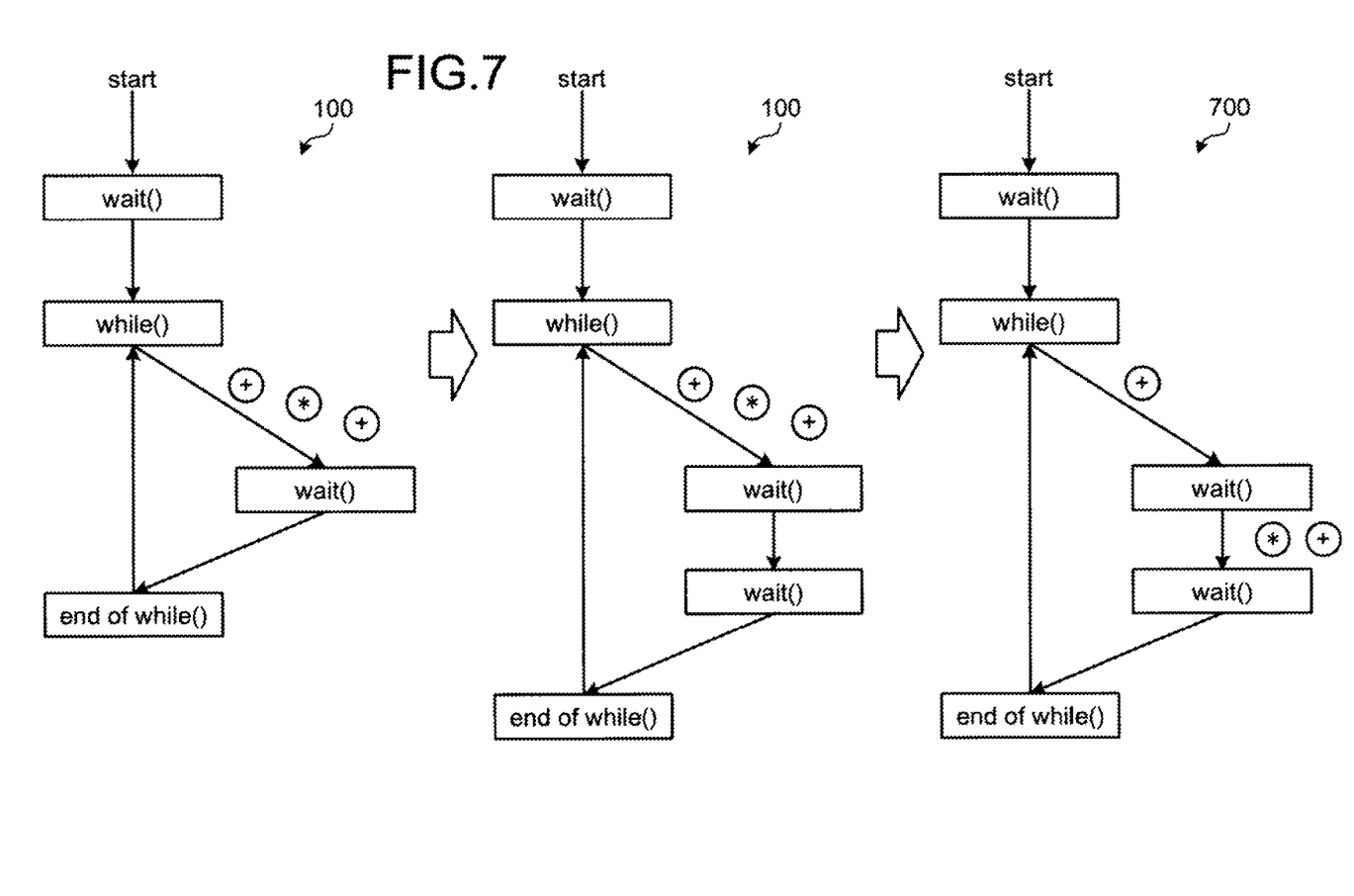
FIG. 7 is an explanatory diagram of an example of synthesis by a synthesizing unit.

FIG. 7 is an explanatory diagram of an example of synthesis by the synthesizing unit 402. Because wait( ) in the CFG conversion result 100 represents a clock cycle, the CFG conversion result 100 in the initial state indicates a circuit operating at one clock cycle. If the number of clock cycles "2" is given as the timing constraint, because the number of wait( ) nodes in the CFG conversion result 100 represents the number of clock cycles, wait( ) is added to the CFG result. As a result, the CFG conversion result 100 indicates the circuit operating at two clock cycles. Subsequently, the synthesizing unit 402 executes scheduling.

Scheduling is a process of allocating each computing circuit to any one of clock cycles. The time length, i.e., the clock period of a clock cycle is the reciprocal of a clock frequency given as the timing constraint. For example, when the clock frequency is 400 [MHz], the clock period is 1/400 [μsec]. The synthesizing unit 402, therefore, refers to the memory unit 300 and allocates the computing circuit to a clock cycle so that the delay of the computing circuit is within the clock period of the clock cycle. In the example of FIG. 7, a computing circuit corresponding to "add1" is allocated a clock cycle between 0 clock cycle to 1 clock cycle and computing circuits corresponding to "multi" and "out" are allocated to a clock cycle between 1 clock cycle and 2 clock cycles. Through this scheduling, the CFG conversion result 700 is obtained.

The synthesizing unit 402 then performs allocation for the post-scheduling CFG conversion result 700. Allocation is a process of connecting circuit information in the memory unit 300 according to the post-scheduling CFG conversion result 700. In the course of the connection, a computing circuit that can be shared by other elements is connected as a share element. Wait( ) is replaced by a register.

Figure 8:
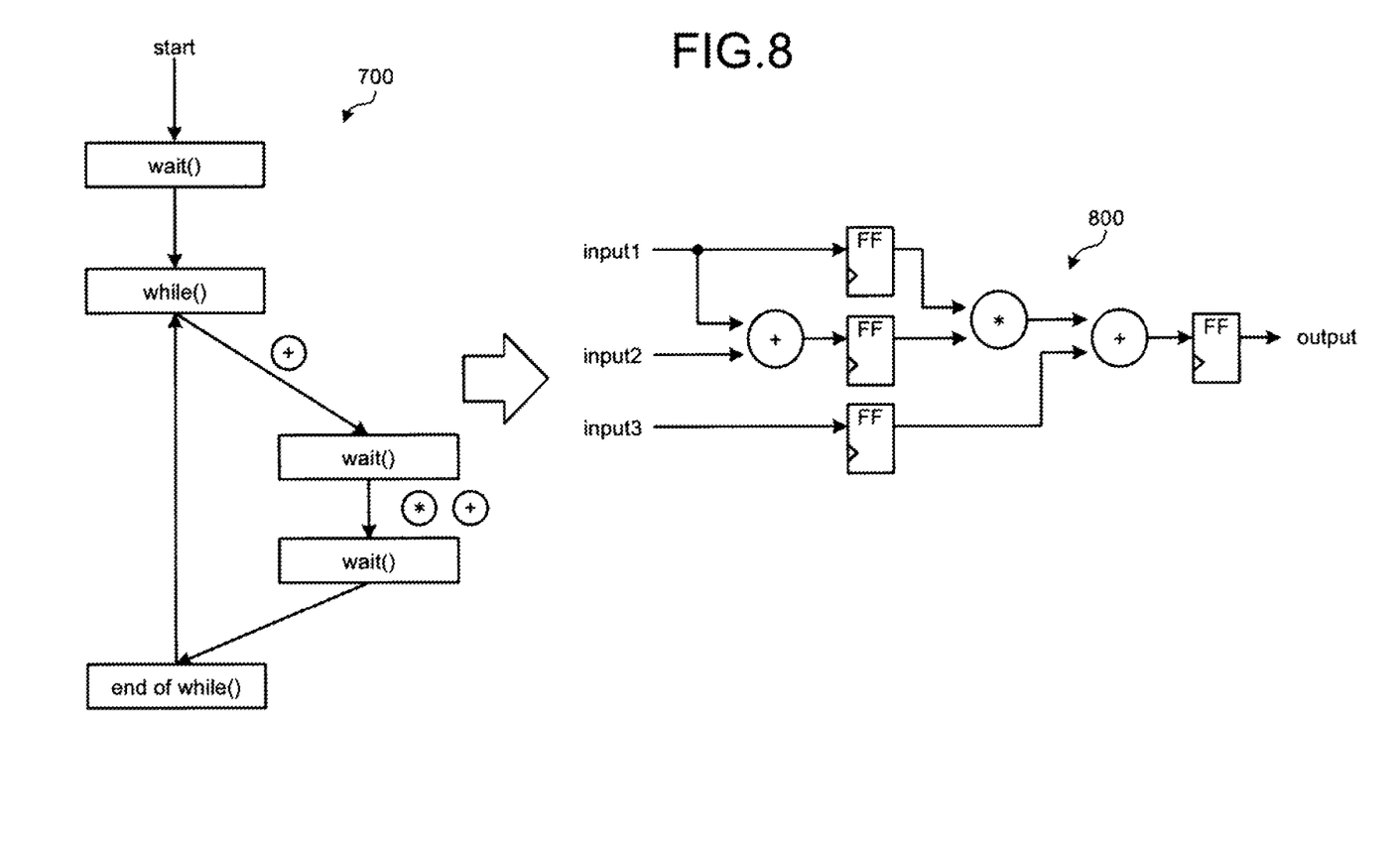
FIG. 8 is an explanatory diagram of an allocation result.

FIG. 8 is an explanatory diagram of an allocation result. An allocation result 800 of FIG. 8 is information obtained as a result of allocation of the CFG conversion result 700 of FIG. 7. The allocation result is output as, for example, RTL description information. The allocation result 800 is equivalent to the second synthesis result 102.

Figure 9:
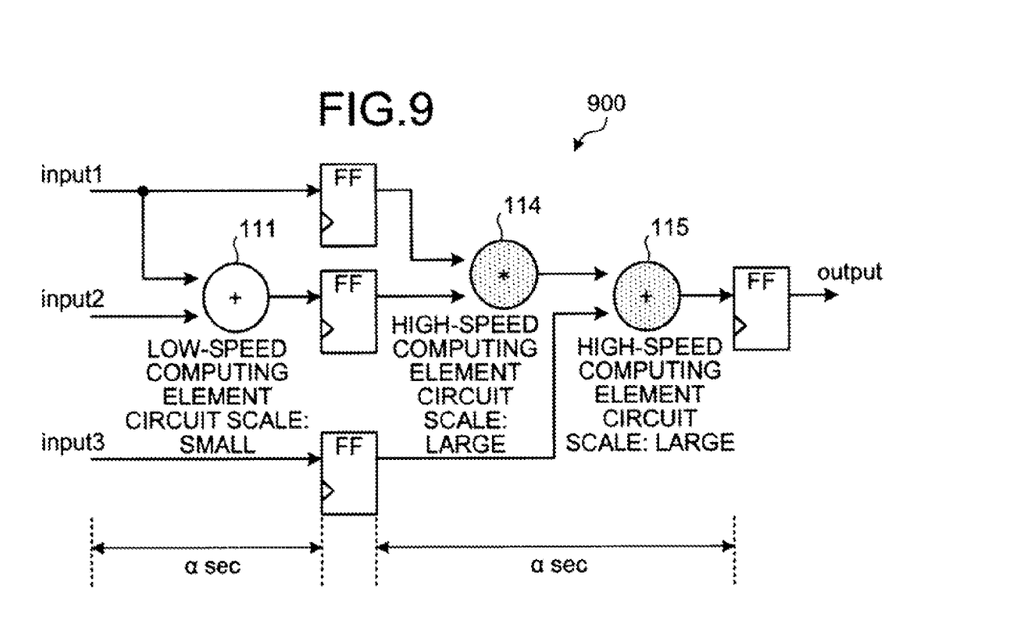
FIG. 9 is an explanatory diagram of a specific example of the allocation result of FIG. 8.

FIG. 9 is an explanatory diagram of a specific example of the allocation result 800 of FIG. 8. FIG. 9 depicts an allocation result 900 in a case of the timing constraint being 2 clock cycles. It is assumed in this example that a clock period of 1 clock cycle is α [sec]. The delay of each of the computing circuits 111, 114, and 115 is less than or equal to the clock period α. The total delay of the computing circuits 114 and 115 is also less than or equal to the clock period α. According to the allocation result 900, therefore, the computing circuit 111 is allocated between 0 clock cycles and 1 clock cycle, and the computing circuits 114 and 115 are allocated between 1 clock cycle and 2 clock cycles.

Figure 10:
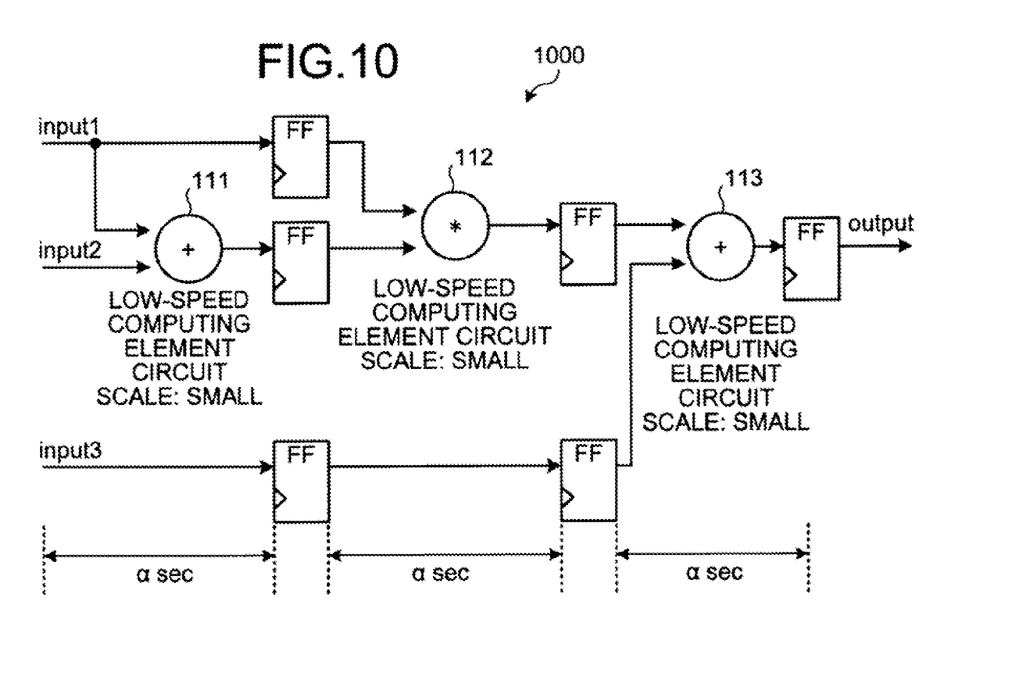
FIG. 10 is an explanatory diagram of another allocation result.

FIG. 10 is an explanatory diagram of another allocation result. FIG. 10 depicts an allocation result 1000 in a case of the timing constraint being 3 clock cycles. It is assumed in this example that a clock period of 1 clock cycle is α [sec]. The delay of each of the computing circuits 111 to 113 is less than or equal to the clock period α. According to the allocation result 1000, therefore, the computing circuit 111 is allocated between 0 clock cycles and 1 clock cycle, the computing circuits 112 is allocated between 1 clock cycle and 2 clock cycles, and the computing circuits 113 is allocated between 2 clock cycles and 3 clock cycles.

Comparison between FIG. 9 and FIG. 10 reveals that in FIG. 9, because the total delay of a multiplier and an adder must be within α [sec] between 1 clock cycle and 2 clock cycles, the computing circuits 114 and 115 having less delay than the computing circuits 112 and 113 are adopted as computing circuits allocated between 1 clock cycle and 2 clock cycles. In FIG. 10, for example, the computing circuits 112 and 114 serve as multipliers and each have a delay within the clock period α, so that the computing circuit 112 smaller in circuit scale than the computing circuit 114 is adopted as a computing circuit allocated between 1 clock cycle and 2 clock cycles. The same adoption method applies to a case of the computing circuits 113 and 115.

When the timing constraint is specified as 2 clock cycles, the allocation result of FIG. 9 is obtained. When the timing constraint is specified as 3 clock cycles, the allocation result of FIG. 10 is obtained. When the timing constraint is specified as 2 to 3 clock cycles, both allocation results are obtained.

FIG. 4 is referred to again. The acquiring unit 403 acquires the second synthesis result 102 for the circuit-under-design that conforms to the timing constraint, based on the CFG conversion result 100 for the circuit-under-design. For example, the acquiring unit 403 acquires an allocation result given by the synthesizing unit 402. The synthesizing unit 402 may be present outside the design support apparatus 400, in which case the acquiring unit 403 may acquire an allocation result from outside the design support apparatus 400. In such a case, the synthesizing unit 402 is not included in the design support apparatus 400.

The generating unit 404 generates based on the CFG conversion result 100 for the operation description information 500 concerning the circuit-under-design, the first synthesis result 101 according to which the time length of 1 clock cycle of the circuit-under-design is greater than or equal to the clock period in which the circuit-under-design operates. For example, the generating unit 404 does not execute ordinary high-level synthesis, i.e., the above process by the synthesizing unit 402, but rather generates the first synthesis result 101 in which a group of computing circuits are arranged according to the CFG conversion result 100 and a register is located at the final stage, as an allocation result. The first synthesis result 101 indicates the circuit operating at 1 clock cycle. In this case, the time length of 1 clock cycle, i.e., the clock period is a time length greater than or equal to the clock period in which the circuit-under-design operates.

Figure 11:
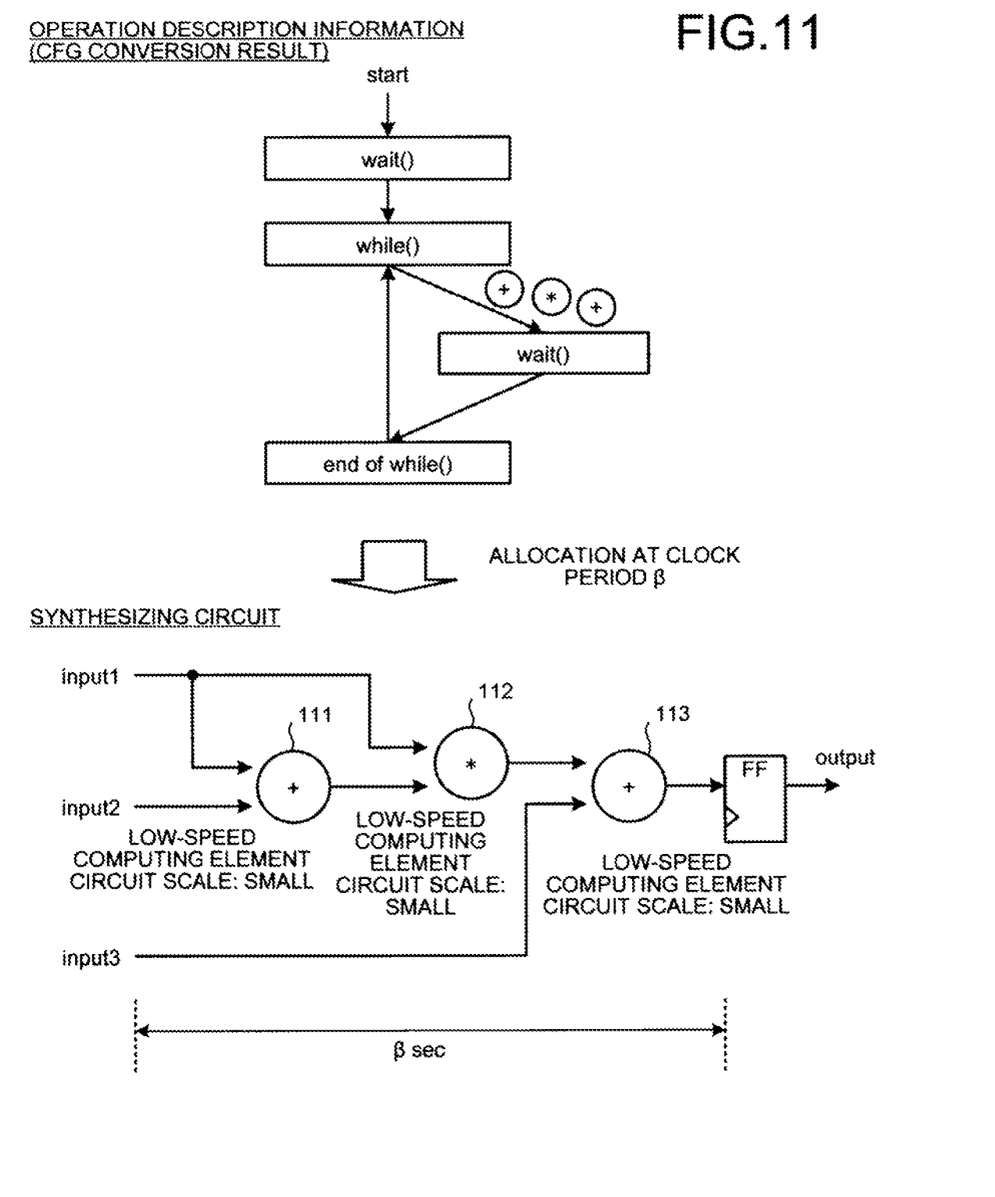
FIG. 11 is an explanatory diagram of an example of a first synthesis result generated by a generating unit.

FIG. 11 is an explanatory diagram of an example of the first synthesis result 101 generated by the generating unit 404. According to the first synthesis result 101, the computing circuits 111 to 113 having the smallest circuit scale are adopted as adders and a multiplier. A smaller circuit scale leads to a larger delay, but the clock period of 1 clock cycle is determined to be sufficiently large so that the total delay of the computing circuits 111 to 113 is within the clock period. The clock period of 1 clock cycle is set in advance to a sufficiently large clock period β, for example, 100 [sec]. The clock period β may be set to a value greater than or equal to the total delay of the computing circuits and the register at the final stage of the circuit-under-design.

In the example of FIG. 11, the first synthesis result 101 is generated by adopting the circuits having the smallest circuit scale. The generating unit 404, however, is allowed to adopt a circuit of any circuit scale if the delay of the circuit is within the clock period β. For example, when priority is given to a smaller circuit scale, the generating unit 404 refers to the memory unit 300 and adopts the circuit having the smallest circuit scale as in the above case. When priority is given to a higher operation rate, the generating unit 404 refers to the memory unit 300 and adopts the circuit having the smallest delay. When both requirements for a smaller circuit scale and a higher operation rate should be met, the generating unit 404 refers to the memory unit 300 and adopts a circuit that is average in terms of circuit scale and operation rate.

FIG. 4 is referred to again. The first calculating unit 405 calculates based on the first synthesis result 101 generated by the generating unit 404, the first circuit scale information S0 indicating the circuit scale of the circuit-under-design. For example, the first calculating unit 405 refers to the memory unit 300, reads out the areas of circuits in the first synthesis result 101, and calculates the sum of the areas. The calculated sum is equivalent to the first circuit scale information S0 indicating the circuit scale of the circuit-under-design.

The second calculating unit 406 calculates based on the second synthesis result 102 acquired by the acquiring unit 403, the second circuit scale information S1 indicating the circuit scale of the circuit-under-design. In the same manner as the first calculating unit 405, for example, the second calculating unit 406 refers to the memory unit 300, reads out the areas of circuits in the second synthesis result 102, and calculates the sum of the areas. The calculated sum is equivalent to the second circuit scale information S1 indicating the circuit scale of the circuit-under-design. When multiple second synthesis results 102 are acquired, the second circuit scale information is calculated for each of the second synthesis results 102.

The output unit 407 outputs the first circuit scale information S0 calculated by the first calculating unit 405 and the second circuit scale information S1 calculated by the second calculating unit 406. For example, the output unit 407 prints out the first circuit scale information S0 and second circuit scale information S1, displays the first circuit scale information S0 and second circuit scale information S1 on the display 208, or transmits the first circuit scale information S0 and second circuit scale information S1 to an external apparatus, or may store the first circuit scale information S0 and second circuit scale information S1 in a storage device in the design support apparatus 400. As a result, the designer can check the first circuit scale information S0 and the second circuit scale information S1 and objectively understand the circuit scale of the second synthesis result 102.

The determining unit 408 determines based on the first circuit scale information S0 and the second circuit scale information S1, the appropriateness of the circuit scale indicated by the second synthesis result 102. For example, the determining unit 408 determines the appropriateness of the circuit scale indicated by the second synthesis result 102 by comparing a threshold and the difference of the second circuit scale information S1 less the first circuit scale information S0. For example, the determining unit 408 obtains the difference by subtracting the first circuit scale information S0 from the second circuit scale information S1, as the comparison information C1 and determines whether the comparison information C1 is greater than or equal to the threshold Ct. If the comparison information C1 is greater than or equal to the threshold Ct, the second synthesis result 102 is determined to be circuit information that should not be adopted.

The determining unit 408 may determine the appropriateness of the circuit scale indicated by the second synthesis result 102 by comparing a ratio of the first circuit scale information S0 and the second circuit scale information S1 and a threshold. For example, the determining unit 408 obtains the ratio by dividing the second circuit scale information S1 by the first circuit scale information S0, as the comparison information C1 and determines whether the comparison information C1 is greater than or equal to the threshold Ct. If the comparison information C1 is greater than or equal to the threshold Ct, the second synthesis result 102 is determined to be circuit information that should not be adopted.

If the comparison information C1 is smaller than the threshold Ct, the determining unit 408 stores the second synthesis result 102 in a storage device, as a synthesis result that can be adopted. If the comparison information C1 is greater than or equal to the threshold Ct, the output unit 407 outputs alarm information. Alarm information is, for example, information indicating that the comparison information C1 is greater than or equal to the threshold Ct. The output unit 407 associates and outputs the alarm information and the second synthesis result 102. The alarm information may be output as an alarm sound, enabling the designer to objectively understand the second synthesis result 102 indicating a large circuit scale and thereby, suppress an increase in the circuit scale at the time of circuit design.

Figure 12:
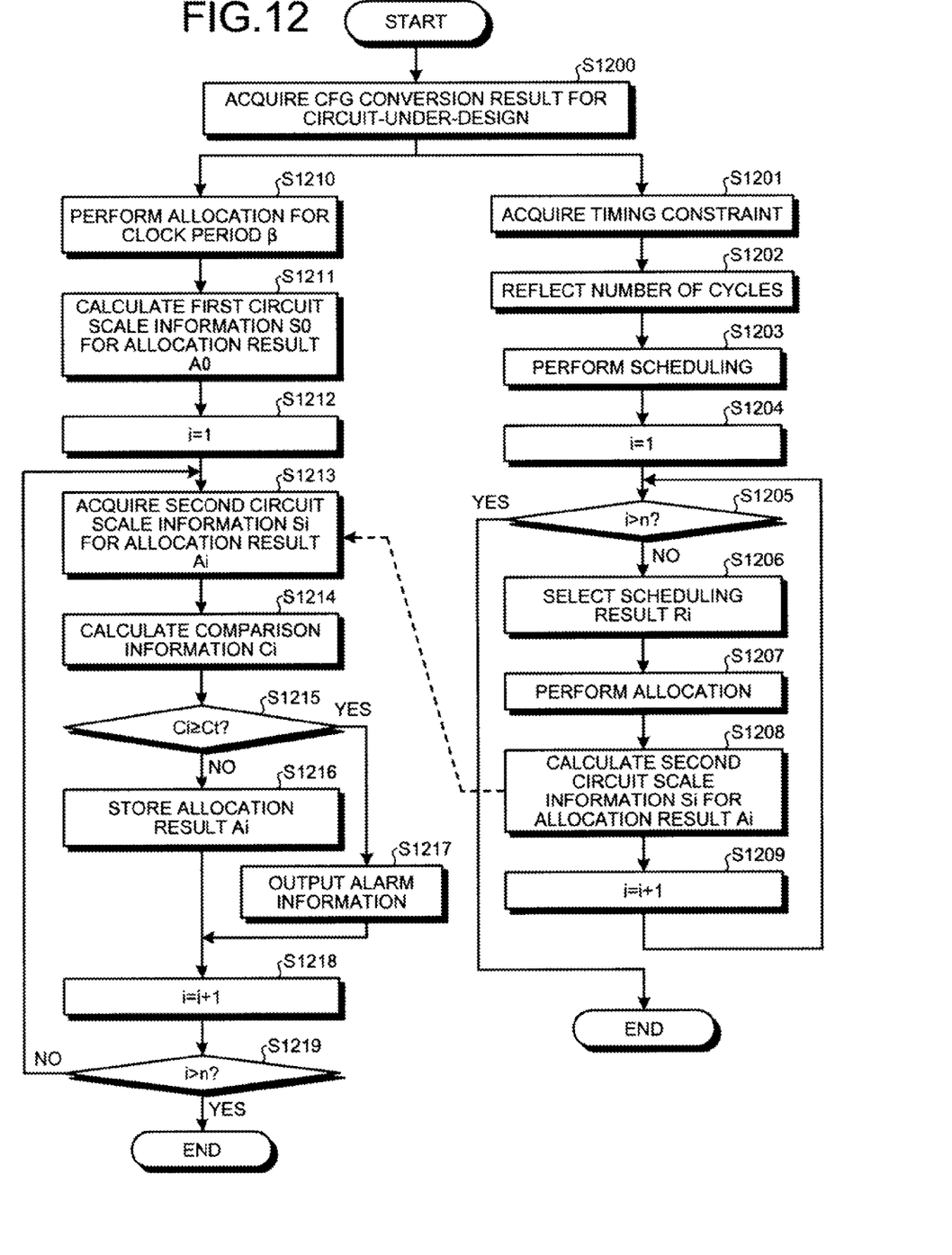
FIG. 12 is a flowchart of an example of a design support procedure by the design support apparatus.

FIG. 12 is a flowchart of an example of a design support procedure by the design support apparatus 400. The design support apparatus 400 causes the converting unit 401 to acquire the CFG conversion result 100 for the circuit-under-design (step S1200). Subsequently, a process of generating the second synthesis result 102 (steps S1201 to S1209) and a process of generating the first synthesis result 101 and a circuit scale determining process (steps S1211 to S1218) are executed. The process of generating the second synthesis result 102 (steps S1201 to S1209) will be described first.

The design support apparatus 400 acquires a timing constraint preliminarily stored in a storage device (step S1201), and causes the synthesizing unit 402 to reflect the number of cycles on the CFG conversion result 100 (step S1202) and perform scheduling (step S1203) for the CFG conversion result 100 (step S1203), resulting in the generation of n (n≥1) scheduling results R1 to Rn.

The design support apparatus 400 then sets i=1 (step S1204), and determines whether i>n is satisfied (step S1205). If i>n is not satisfied (step S1205: NO), the design support apparatus 400 selects a scheduling result Ri (step S1206), and performs allocation for the selected scheduling result Ri (step S1207). Consequently, an allocation result Ai is obtained as the second synthesis result 102, and is stored in a storage device.

The design support apparatus 400 causes the second calculating unit 406 to calculate second circuit scale information Si for the allocation result Ai (step S1208). The calculated second circuit scale information Si is stored in a storage device. Subsequently, the design support apparatus 400 increments i by 1 (step S1209), returns to step S1205, and determines whether i>n is satisfied (step S1205). If i>n is satisfied (step S1205: YES), the second circuit scale information Si has been calculated for each scheduling result Ri and consequently, the process of generating the second synthesis result 102 is ended. The process of generating the first synthesis result 101 and the circuit scale determining process (steps S1211 to S1218) will be described.

Following the acquisition of the CFG conversion result 100 (step S1200), the design support apparatus 400 causes the generating unit 400 to perform allocation for the clock period β (step S1210). As a result, allocation result A0 is obtained as the first synthesis result 101. The design support apparatus 400 then causes the first calculating unit 405 to calculate the first circuit scale information S0 for the allocation result A0 (step S1211).

The design support apparatus 400 sets the index i to 1 (step S1212), and acquires second circuit scale information Si for the allocation result Ai calculated at step S1208 (step S1213). The design support apparatus 400 causes the determining unit 408 to calculate the comparison information Ci (step S1214) and determine if the comparison information Ci is greater than or equal to the threshold Ct (step S1215). If Ci≥Ct is not satisfied (step S1215: NO), the design support apparatus 400 determines the allocation result Ai to be an appropriate allocation result, i.e., an allocation result that can be adopted, and stores the appropriate allocation result in a storage device (step S1216), and proceeds to step S1218.

If Ci≥Ct is satisfied (step S1215: YES), the design support apparatus 400 causes the output unit 407 to output alarm information (step S1217), and proceeds to step S1218. The design support apparatus 400 increments i by 1 at step S1218 (step S1218), and determines whether i>n is satisfied (step S1219). If i>n is not satisfied (step S1219: NO), the design support apparatus 400 returns to step S1213, where the design support apparatus 400 acquires the second circuit scale information Si for the allocation result Ai calculated at step S1208 (step S1213).

If i>n is satisfied (step S1219: YES), the process of generating the first synthesis result 101 and the circuit scale determining process are ended. Through this procedure, the designer can objectively interpret a second synthesis result 102 indicating a large circuit scale. The designer, therefore, can suppress increases in the circuit scale at circuit design.

The flowchart of FIG. 12 depicts an example in which the comparison information Ci is calculated and is compared with the threshold Ct. The first circuit scale information S0 and the second circuit scale information S1, however, may be compared with each other where no comparison information Ci is calculated. The first circuit scale information S0 and the second circuit scale information S1 may be output as is without being compared with each other.

An example of the operation description information 500 of the circuit-under-design written in SystemC language is described in the embodiment above. However, the operation description information 500 of the circuit-under-design written in C language or C++ language may also be used.

Figure 13:
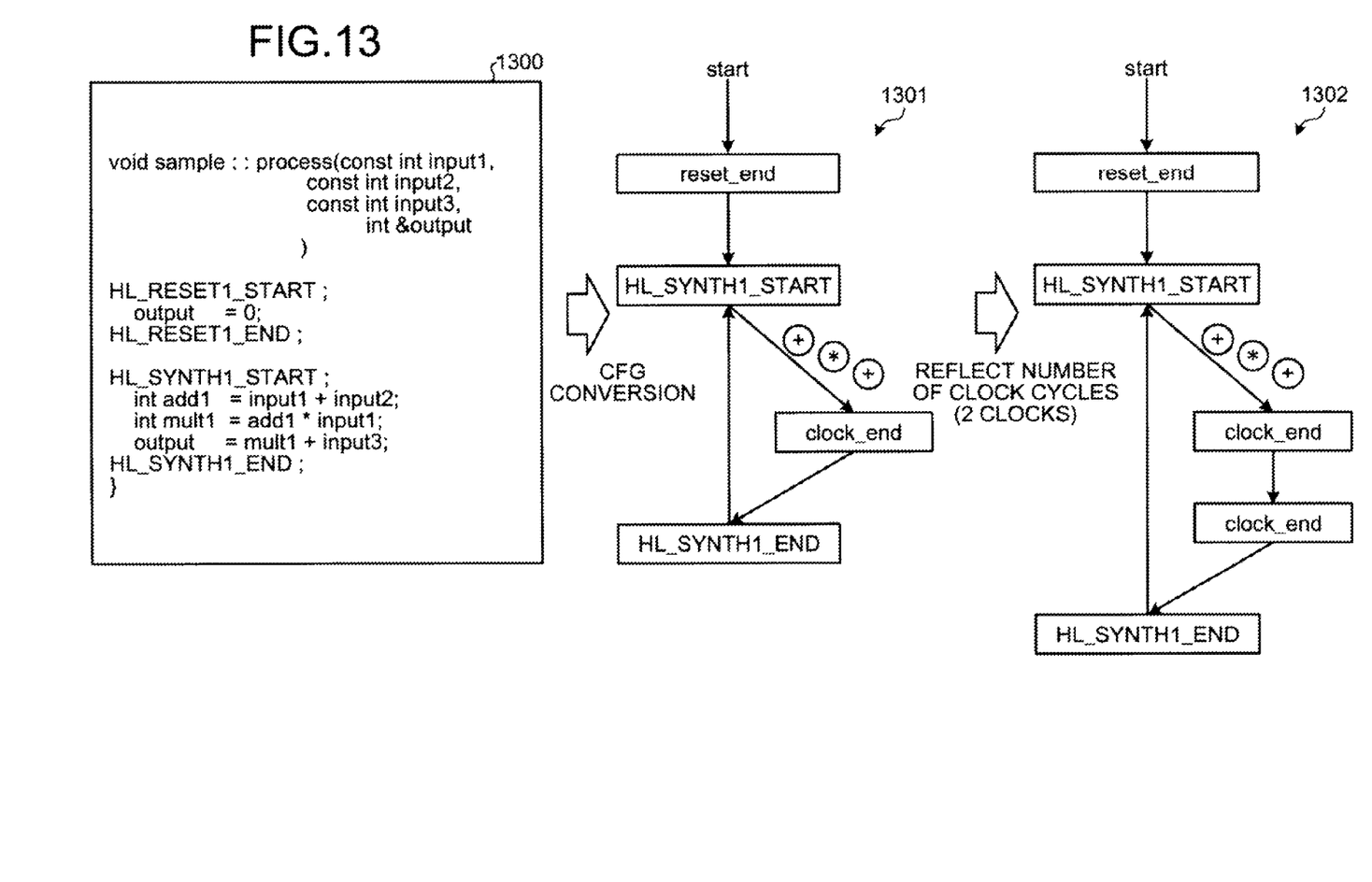
FIG. 13 is an explanatory diagram of an example of CFG conversion based on operation description information written in C language or C++ language.

FIG. 13 is an explanatory diagram of an example of CFG conversion based on operation description information written in C language or C++ language. FIG. 13 depicts operation description information 1300 written in C or C++ language. The depicted operation description information 1300 written in C or C++ language does not include a break in the process caused by the wait( ) statement, which is included in operation description information written in SystemC language. The design support apparatus 400, therefore, specifies a synthesis range using the number of lines or labels, and specifies the number of clock cycles according to the synthesis range.

For example, in the operation description information 1300, the design support apparatus 400 specifies a space between labels "HL_REST1_START" and "HL_REST1_END" as a reset description range for high-level synthesis "reset end". In the operation description information 1300, the design support apparatus 400 also specifies a space between labels "HL_SYNTH1_START" and "HL_SYNTH1_END" as an operation description range for high-level synthesis, and determines a space between end statements "output" and "HL_SYNTH1_END" to be "clock_end".

FIG. 13 depicts a CFG conversion result 1301 of the operation description information 1300 and a CFG conversion result 1302 created by reflecting the number of clock cycles in the CFG conversion result 1301. When the timing constraint specifies "the number of cycles of n", (n−1) statements of "clock_end" are added to a space between "clock_end" and "HL_SYNTH1_END". Since n=2 in the CFG conversion result 1302, one statement of "clock_end" is added to the CFG conversion result 1302. Scheduling to follow this process is the same as the scheduling as described above. In this manner, operation description information written in C or C++ language can be used in the same manner as operation description information written in SystemC language.

As described, according to the embodiment, the design support apparatus 400 provides an objective index for the circuit scale of a high-level synthesis result, enabling the designer to check the appropriateness of the circuit scale.

The design support apparatus 400 determines based on the first circuit scale information and the second circuit scale information, the appropriateness of a circuit scale indicated by the second synthesis result 102. In this manner, the design support apparatus 400 not only provides an objective index for the circuit scale of a circuit obtained by high-level synthesis but also determines the appropriateness of the circuit scale. As a result, a second synthesis result 102 indicating an excessively large circuit scale is distinguished from a second synthesis result 102 indicating a circuit scale within an allowable range. Hence, the design support apparatus 400 can efficiently sort second synthesis results 102, thereby suppressing increases in circuit scale.

The appropriateness of a circuit scale is determined by using a difference obtained by subtracting the first circuit scale information from the second circuit scale information or a ratio between the first circuit scale information and the second circuit scale information. As a result, the appropriateness of the second synthesis result 102 can be evaluated relatively. An objective determination result, therefore, can be obtained.

Because a circuit having the smallest circuit scale is adopted in the first synthesis result 101, a circuit scale of the second synthesis result 102 is an ideal circuit scale that is not smaller than that of the first synthesis result 101. As the circuit scale of the second synthesis result 102 becomes closer to the circuit scale of the first synthesis result 101, the second synthesis result 102 becomes more appropriate as a synthesis result for which increases in circuit scale have been suppressed. Hence, the circuit scale of the circuit-under-design can be reduced by adopting a second synthesis result 102 that is determined to be appropriate.

The design support method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to one aspect of the present invention, an objective index for the circuit scale of a circuit resulting from high-level synthesis is provided to enable the appropriateness of the circuit scale to be checked.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a design support program that causes a computer to execute a process comprising:
    generating based on a control flow graph conversion result for operation description information concerning a circuit-under-design, a first synthesis result according to which a time length of 1 clock cycle of the circuit-under-design is greater than or equal to a clock period in which the circuit-under-design operates;
    calculating based on the generated first synthesis result, first circuit scale information indicating a circuit scale of the circuit-under-design;
    acquiring a second synthesis result that is for the circuit-under-design and conforms to a timing constraint that is based on the control flow graph conversion result;
    calculating second circuit scale information indicating the circuit scale of the circuit-under-design, based on the generated second synthesis result; and
    outputting the calculated first circuit scale information and the calculated second circuit information.

2. The non-transitory computer-readable recording medium according to claim 1, the process further comprising determining based on the first circuit scale information and the second circuit information, appropriateness of the circuit scale indicated by the second synthesis result, wherein
    the outputting includes outputting a determination result.

3. The non-transitory computer-readable medium according to claim 2, wherein
    the determining includes determining the appropriateness of the circuit scale indicated by the second synthesis result, by comparing a threshold and a difference obtained by subtracting the first circuit scale information from the second circuit scale information.

4. The non-transitory computer-readable medium according to claim 2, wherein
    the determining includes determining the appropriateness of the circuit scale indicated by the second synthesis result, by comparing a threshold and a ratio of the first circuit scale information and the second circuit scale information.

5. The non-transitory computer-readable medium according to claim 3, wherein
    the outputting includes outputting alarm information when the determination result is a value greater than or equal to the threshold.

6. The non-transitory computer-readable medium according to claim 4, wherein
    the outputting includes outputting alarm information when the determination result is a value greater than or equal to the threshold.

7. The non-transitory computer-readable medium according to claim 1, wherein
    the generating includes generating the first synthesis result by acquiring from a memory unit storing therein delay for each computing element, a computing element having the smallest delay among computing elements included in the circuit-under-design.

8. A design support method executed by a computer, the design support method comprising:
    generating, by a processor, based on a control flow graph conversion result for operation description information concerning a circuit-under-design, a first synthesis result according to which a time length of 1 clock cycle of the circuit-under-design is greater than or equal to a clock period in which the circuit-under-design operates;
    calculating, by the processor, based on the generated first synthesis result, first circuit scale information indicating a circuit scale of the circuit-under-design;
    acquiring, by the processor, a second synthesis result that is for the circuit-under-design and conforms to a timing constraint that is based on the control flow graph conversion result;
    calculating, by the processor, second circuit scale information indicating the circuit scale of the circuit-under-design, based on the generated second synthesis result; and
    outputting, by the processor, the calculated first circuit scale information and the calculated second circuit information.

9. A design support apparatus comprising a computer configured to:
    generate based on a control flow graph conversion result for operation description information concerning a circuit-under-design, a first synthesis result according to which a time length of 1 clock cycle of the circuit-under-design is greater than or equal to a clock period in which the circuit-under-design operates;
    calculate based on the generated first synthesis result, first circuit scale information indicating a circuit scale of the circuit-under-design;
    acquire a second synthesis result that is for the circuit-under-design and conforms to a timing constraint that is based on the control flow graph conversion result;
    calculate second circuit scale information indicating the circuit scale of the circuit-under-design, based on the generated second synthesis result; and
    output the calculated first circuit scale information and the calculated second circuit information.

* * * * *